United States Patent [19]

Aitken et al.

[11] 4,097,427

[45] Jun. 27, 1978

[54] CATIONIZATION OF STARCH UTILIZING ALKALI METAL HYDROXIDE, CATIONIC WATER-SOLUBLE POLYMER AND OXIDANT FOR IMPROVED WET END STRENGTH

[75] Inventors: Thomas Aitken, Chicago, Ill.; Wilfred D. Pote, Appleton, Wis.

[73] Assignee: Nalco Chemical Company, Oak Brook, Ill.

[21] Appl. No.: 768,114

[22] Filed: Feb. 14, 1977

[51] Int. Cl.$^2$ .............................................. C08L 3/02
[52] U.S. Cl. ................................. 260/9; 162/164 EP; 162/168 N; 162/169; 162/175; 260/17.4 ST
[58] Field of Search ............................. 260/9, 17.4 ST

[56] References Cited

U.S. PATENT DOCUMENTS

| 3,674,725 | 7/1972 | Aitken et al. | 260/9 |
|---|---|---|---|
| 3,931,422 | 1/1976 | Bateman et al. | 260/9 |

*Primary Examiner*—Harold D. Anderson
*Attorney, Agent, or Firm*—John G. Premo; Robert A. Miller; Barry W. Sufrin

[57] ABSTRACT

An improved method for cationizing starch which comprises reacting an aqueous slurry of starch under alkaline conditions with a water-soluble quaternary ammonium polymer in the presence of a small amount of a metal-free oxidizing agent.

8 Claims, No Drawings

CATIONIZATION OF STARCH UTILIZING ALKALI METAL HYDROXIDE, CATIONIC WATER-SOLUBLE POLYMER AND OXIDANT FOR IMPROVED WET END STRENGTH

INTRODUCTION

It has been shown that starches can be effectively cationized in or following the starch cooking (gelatinization) operation by application, under appropriate alkaline conditions, of certain classes of cationic polymers. One particular use for cationic starches prepared in this manner has been in wet end application to paper furnishes to increase filler retention and paper dry strength. Examples of such processes are described in U.S. Pat. Nos. 3,674,725 and 3,854,970.

If starches are highly-degraded by molecular weight reduction by, for example, acid-hydrolysis or oxidation, they are not highly efficient in wet end paper application. Thus, in the past, it has been preferred to use starches which were completely unmodified or only slightly degraded by such processes. Completely unmodified starches are generally preferred because of their lower cost and ready availability. Unmodified starches, when treated in accordance with the practices of this invention, provide improved cationic starches which are extremely valuable when used in wet end applications to paper furnishes.

THE INVENTION

This invention provides an improved method for cationizing starch which comprises reacting an aqueous slurry of starch under alkaline conditions with a water-soluble quaternary ammonium polymer in the presence of a small amount of a metal-free oxidizing agent.

The Starch Slurry

The invention is primarily directed to cationizing starch which is used in treating paper. Typical starches that are used are corn and tapioca starch although it is understood that other starches which are normally used in treating paper may be employed in the practice of the invention. In most papermaking operations, starch is cooked or gelatinized by treating aqueous slurries which contain 1 – 10% by weight starch for a period of time sufficient to cause gelatinization thereof.

The most common method of preparing starch slurries is to subject aqueous starch slurries to a process known as jet cooking. This is a continuous cooking process that is well known in the paper industry. Conventionally, a 15 – 40% aqueous starch slurry is added to a jet cooker and diluted in line to form within the continuous cooking area of the apparatus a 4 – 5% slurry. Most commonly, the cooking temperatures are 230° – 240° F., although cooking temperatures within the range of 212° – 320° F. may be employed. The cooking time in jet cookers lasts for only a few seconds to upwards to 7 minutes or more.

Another common method of preparing cooked or gelatinized starches is known as batch cooking wherein a 1 – 10% and, preferably, a 2 – 7% aqueous slurry of starch is prepared and cooked over temperatures ranging between 185° – 205° F. for periods of time ranging between about 15 minutes to about 1 hour. The present invention contemplates using batch temperatures of about 200° for about 30 minutes.

The Water-Soluble Quaternary Ammonium Polymers

It is now known that starch, when cooked in the presence of certain cationic polymers, is modified by these polymers and the performance of the starch in many papermaking operations is substantially improved.

In the practice of this invention, there are employed as the cationic polymers water-soluble polymers which contain a plurality of quaternary ammonium groupings which impart to the polymer and the subsequently treated starch a substantial cationic charge. When used in the practice of the invention, these polymers are applied to the starch based on active polymer in an amount ranging from 1-15% by weight of the starch and, in a preferred practice of the invention, in amounts ranging from 3.5 – 7% by weight.

A wide variety of water-soluble quaternary ammonium polymers may be used. These polymers, for the most part, are sold commercially as concentrated aqueous solutions and have molecular weights ranging between 10,000 – 800,000.

Typical of such polymers are the following:

A. Epichlorohydrin dimethylamine quaternary ammonium polymers and epichlorohydrin dimethylamine ammonia or polyamine quaternary polymers. These materials are well known and are described in complete detail in U.S. Pat. Nos. 3,738,945 and in 3,930,877. A typical commercial preparation of an epichlorohydrin-dimethylamine-ammonia polymer is set forth below:

Preparation of Epi-DMA-NH₃ Polymer

In a pilot plant set up embodying a 2000-gallon batch size reactor, a 250-gallon weight tank, and an optional recycle loop with an in-line viscometer and recorder, the following materials were utilized in weight percent and pounds noted:

| Raw Materials | | |
|---|---|---|
| Soft Water | 37.459 | 7130 |
| 60% Dimethylamine Solution | 22.773 | 4334 |
| Epichlorohydrin | 34.315 | 6531 |
| Aqua Ammonia 26° Be (Spec. Grav. 0.895 – 0.900 at 20° C.) | 2.046 | 389 |
| 50% Caustic | 1.981 | 377 |
| 37% Hydrochloric Acid | 1.426 | 271 |
| | 100.000 | 19032 |

After preliminary cleaning of the reactor and leak testing, 7,130 pounds or 885 gallons of soft water were added to the reactor and then the reactor was charged with 389 pounds of ammonia, using reactor vaccum to suck material from the drum. Then 4,334 pounds of 60 percent dimethyl amine (DMA) solution was added to the reactor. Epichlorohydrin was added at about 20 pounds per minute to the full amount of 6,531 pounds.

The temperature was monitored to about 80° C. (176° F.) and while the epi was being added (about 6 hours). At the end of the epi addition, the temperature was held at 80° C. for about half an hour and then 377 pounds of 50 percent NaOH was added and pH and viscosity checks were made at half hour to 1 hour intervals.

When condensate reaction was complete to 600-700 cps as measured by viscosity determination, the HCl 37 percent was added to acidify to a pH of 3.0 and the product was cooled. The product produced was a condensate of 90 percent DMA—10 percent NH₃—epichlorohydrin. This polymer is hereinafter referred to as Polymer A.

B. Water-soluble homopolymers prepared from quaternized diallylamines. Polymers of this type are described in detail in U.S. Pat. No. 3,288,770 and in *Chemical & Engineering News,* Mar. 11, 1957, pages 22 and 24. A preferred material is a linear copolymer of diallyl dimethyl ammonium chloride, which polymer is hereinafter referred to as Polymer B. This particular polymer as used hereinafter is a commercial material sold as a 30% by weight aqueous solution.

C. Polyepichlorohydrin which has been condensed with low molecular weight tertiary aliphatic amines. Such polymers are described in U.S. Pat. No. 3,320,317.

D. Polyethylenimine which has been reacted with lower alkyl halides such as methylchloride to produce the corresponding quaternary ammonium polymer.

E. Condensates of ethylene dichloride and ammonia which have been reacted with lower alkyl halides to produce quaternary ammonium polymers.

Other water-soluble quaternary ammonium polymers may be used in the practice of the invention without departing from the spirit and scope thereof.

Causticizing Agent

It is now known that when polymers of the above type are used to modify starch slurries during the cooking thereof, that notable improvements are achieved when the cooking is done under alkaline conditions. This phenomenon is described in detail in U.S. Pat. Nos. 3,674,725 and 3,854,970. The disclosures of these patents are incorporated herein by reference.

The polymer is cooked with the starch under alkaline conditions which means the pH should be adjusted to at least 8. This substantially improves the quality of the starch when used in paper-making operations. The preferred alkaline material for this purpose is sodium hydroxide, although other water-soluble bases such as soda ash, potassium hydroxide, sodium aluminate, Ca(OH)$_2$, and the like may be used. When sodium hydroxide is used, it may be varied between the range of 0.5 – 10% by weight based on the weight of dry starch in the slurry. 5% gives excellent results in most instances.

The Metal Free-Oxidizing Agent

The metal-free oxidizing agent may be selected from a wide group of oxidizing agents. By the term, metal-free, is meant an oxidizing agent which does not contain a metal as an anionic constituent of the molecule. Thus, chromates and permanganates are not suitable for use in the practice of the invention since permanganates impart to the starch undesirable purple coloration and the chromates are considered to be too toxic for use in treating paper and paper products.

In a preferred practice of the invention, the oxidizing agents are water-soluble and are preferably inorganic. A most preferred oxidizing agent is ammonium persulfate. In addition to using ammonium persulfate, exemplary of other oxidizing agents are potassium persulfate, hydrogen peroxide, various hypochlorites such as sodium hypochlorite, ozone, and certain organic peroxides and hydroperoxides such as t-butyl hydroperoxide. While chlorine may be used, it is not preferred. Sparingly, water-soluble oxidizing agents may be used.

The amount of oxidizing agent required to produce the improved cationic starches may be varied in amounts ranging from 0.04 – 1% based on the weight of the starch present in the slurry. Excellent results are achieved when the amount used is within the range of 0.1 – 0.4%. For best results, it is desirable that the oxidizing agent be added to the starch prior to cooking.

EXAMPLES

The cooked, cationized starches were evaluated in wet end application to paper furnishes by dry strength improvement of the finished paper, and for furnish containing clay and titanium dioxide fillers, for filler retention as measured photometrically.

To measure dry strength performance, a laboratory Noble and Wood handsheet machine was used. Furnish was an unbleached softwood kraft pulp of 25 seconds Williams slowness. A given weight of pulp slurry was treated with a fixed level of starch, mixed, diluted, and handsheets of 100 grams/square meter basis weight prepared. After conditioning, the handsheets containing the cationic starch were tested for burst strength improvement over handsheets prepared without starch addition (Burst Strength-TAPPI Standard T403 m 53).

For paper furnish containing filler (clay and titanium dioxide), filler retention was measured with use of a "Dynamic Drainage Jar" (developed by State University of New York). An aliquot of effluent was tested photometrically for filler content.

In those studies, unmodified corn starch (Globe 3005) was used. The process is applicable to other unmodified starches. In much of this work, ammonium persulfate was used (hereafter designated APS).

In most of the work, Polymer A was used.

EXAMPLE 1

Effect of Ammonium Persulfate (APS) Application Level

In this study, the unmodified starch was slurried at 5% concentration in water. 6.6% active Polymer A on dry starch weight was added to the slurry. This was followed by APS and by 5% active NaOH on starch weight as a 50% NaOH solution. Good stirring of this slurry prevailed. This slurry was therewith jet cooked in a laboratory jet cooker at 250° F. A sample of the cooked starch was diluted to 2% total solids concentration and evaluated for dry strength in wet end application to a papermaking slurry as described heretofore. Application to the paper furnish was 10 lbs. per ton as cationic starch. Burst (mullen) improvements over that for a furnish containing no starch were as follows:

|  |  |  |  | Viscosity of 2% Starch After Cooling to 80° F. |
|---|---|---|---|---|
| No APS |  | burst increase over blank | 16.3 pts. | 115 cps |
| 0.05% | APS on air dry starch | burst increase over blank | 18.6 pts. | 40 cps |
| 0.10% | " | burst increase over blank | 22.3 pts. | 30 cps |
| 0.20% | " | burst increase over blank | 22.0 pts. | 18.5 cps |

In all the following dry strength studies as given in Examples 2 – 8, starch application to pulp slurry was 7.5 lbs/T.

EXAMPLE 2

Effort of Cationic Polymer Application Level

Starch cooking conditions - similar to Example 1, with 5% NaOH on starch. Where used, APS application was 0.2% on starch. In handsheet work, starch application was 7.5 lbs/T instead of 10 lbs/T.

3.8% active Polymer A on starch, no APS-burst improvement over blank 13.6 pts.
6.6% active Polymer A on starch, no APS-burst improvement over blank 16.3 pts.
1.9% active Polymer A on starch, 0.2% APS-burst improvement over blank 5.3 pts.
3.8% active Polymer A on starch, 0.2% APS-burst improvement over blank 19.5 pts.
4.9% active Polymer A on starch, 0.2% APS-burst improvement over blank 19.6 pts.
6.6% active Polymer A on starch, 0.2% APS-burst improvement over blank 19.6 pts.

As shown, for use of the oxidant, high strength was realized with as little as 3.8% active polymer on starch weight.

EXAMPLE 3

Jet Cooking as Above — Effect of Cooking Temperature

Active polymer application 3.8% on starch, otherwise cooking conditions similar to Example 1. Starch application 7.5 lbs/T.

| No. APS cook temp. | 233° F. | Burst increase | 9.6 pts. |
|---|---|---|---|
|  | 250° F. |  | 12.5 pts. |
|  | 265° F. |  | 13.6 pts. |
|  | 278° F. |  | 12.8 pts. |
| 0.1% APS cook temp. | 215° F. |  | 12.9 pts. |
|  | 250° F. |  | 18.8 pts. |
|  | 275° F. |  | 13.5 pts. |
|  | 300° F. |  | 12.0 pts. |

Thus, for this particular laboratory jet cooker, with application of 5% NaOH on starch weight 250° F. appears to be a suitable cooking temperature.

Again, higher strength improvement was realized for use of APS than without an oxidant.

EXAMPLE 4

Jet Cooking with use of APS

Effect of Starch Cooking Concentration

Temperature 250° F., 3.8% active polymer on starch, 5% NaOH on starch. Starch application 7.5 lbs/T in handsheet work.

| Cooking concentration | 3.5% | Burst Increase | 14 pts. |
|---|---|---|---|
|  | 5% | " | 18.6 pts. |
|  | 7% | " | 18.6 pts. |

At this caustic level, cooking at 5% starch concentration gives higher performance than cooking at lower starch concentrations.

EXAMPLE 5

Jet Cooking with use of APS

Effect of Caustic Application Level

Temperature 250° F., 5% starch concentration, 3.8% active polyer on starch 0.15% APS on starch. Starch application on handsheet work 7.5 lbs/T.

6.5% active NaOH on air dry starch, burst increase over blank 19.5 pts.
5% active NaOH on air dry starch, burst increase over blank 19 pts.
2.5% active NaOH on air dry starch, burst increase over blank 12.5 pts.
1.5% active NaOH on air dry starch, burst increase over blank 8.2 pts.
0% active NaOH on air dry starch, burst increase over blank 7.0 pts.

These results show that for the particular cooking conditions used, a moderately high level of caustic was required.

EXAMPLE 6

This example compares use of hydrogen peroxide as the oxidant in contrast to ammonium persulfate. In this comparison, the starches were jet cooked at 3.5% starch concentration, with application of 5.2% active polymer on air dry starch with 5% NaOH on starch weight. Cooking temperature was 250° F. Starch application to pulp furnish was 7.5 lbs/T.

| 0.11% active $H_2O_2$ on starch | Burst increase | 16.5 pts. |
|---|---|---|
| 0.15% ammonium persulfate on starch | " | 16.5 pts. |

Thus, generally similar results can be realized with $H_2O_2$ in place of APS.

EXAMPLE 7

In this study, thick starch slurries of 35% starch concentration in water were prepared. The polymer and oxidant were added and the slurry stirred for 24 hours at room temperature. Therewith, the slurry was diluted to 5% starch concentration, 5% active NaOH added on starch weight, the slurry jet-cooked at 250° F., diluted to 2% starch concentration and evaluated for dry strength improvement, and for a furnish containing filler, for filler retention.

Use of potassium persulfate was included in this comparison in place of APS.

| Polymer | Oxidant | Burst Increase over blank | Phototest Retention No. |
|---|---|---|---|
| Blank |  |  | 292 |
| A-3.8% active on starch | APS 0.15% on starch | 18.6 | 190 |
| A-6.6% active on starch | APS 0.15% on starch | 22.5 | 170 |
| B-3.8% active on starch | APS 0.15% on starch | 19.2 | 213 |
| B-6.6% active on starch | APS 0.15% on starch | 22.8 | 222 |
| A-3.8% active on starch | Potassium persulfate 0.126% on starch | 18.8 | 180 |

| For comparison - freshly prepared starches were included: | | |
|---|---|---|
|  | Burst Increase over blank | Phototest Retention No. |
| Polymer A-3.8% active on Starch | APS 0.15% on starch | — | 165 |
| Commercial competitive Cationic Starch |  | 21.0 | 162 |

The above comparisons show that Polymer B, likewise, gives good performance by this process. The work shows that, similar to APS, potassium persulfate can be effectively used.

By the phototest, a reduction in phototest number indicates improved retention performance. By this process, filler retention is enhanced.

EXAMPLE 8

Use of APS in Batch Cooking

In batch cooking, the starch is cooked in an open vessel at atmospheric pressure. In this work, the starch slurries were treated with 5% active NaOH on starch weight, with APS, cooked for 30 minutes at 200° F., and quenched to 2% starch concentration and Polymer A added. The starches were stirred briefly before handsheet evaluation.

| APS % on Starch | Active Polymer A Added After Cook | Burst Increase over Blank | Viscosity of Cooled 2% Starch |
|---|---|---|---|
| 0 | 3.8% on starch | 12.0 pts. | 212 cps |
| 0.1 | 3.8% on starch | 12.9 pts. | 50 cps |
| 0.2 | 3.8% on starch | 16.8 pts. | 47.5 cps |
| 0.3 | 3.8% on starch | 17.4 pts. | 30 cps |

This work serves to show that this class of oxidants can be used to enhance performance in our process in batch cooking.

APS requirement for optimum performance can vary with particular cooking conditions.

From the above data, it is evident that the metal-free oxidizing agents, when used as shown herein, allow high quality cationic starches to be prepared using very small amounts of water-soluble cationic polymers. Thus, a variety of starches may be modified at a lower cost to the paper makers, thus making the use of these starches more attractive both from the standpoint of economics and performance.

Having thus described our invention, it is claimed as follows:

1. An improved method for the cationization of starch which comprises cooking starch at a temperature and for a period of time to cause gelation and under alkaline conditions with a water soluble quaternary ammonium polymer in the presence of an oxidizing agent from the group consisting of ammonium persulfate, potassium persulfate, hydrogen peroxide, sodium hypochlorite, ozone, and t-butyl hydroperoxide.

2. The method of claim 1 wherein the metal-free oxidizing agent is potassium persulfate.

3. The method of claim 1 wherein the metal-free water soluble inorganic oxidizing agent is ammonium persulfate.

4. The method of claim 3 where the oxidizing agent is applied to the starch prior to cooking.

5. The method of claim 4 where the starch is cooked in a jet cooker at a temperature within the range of 212°–320° F.

6. An improved method of cationizing starch which comprises forming 1–10% aqueous slurry of starch and then cooking the starch at a temperature and for a period of time to cause gelatinization thereof in the presence of from 0.5–10% by weight of sodium hydroxide with from 1–15% by weight of a water soluble quaternary ammonium polymer selected from the group consisting of quaternized polyepichlorohydrin polymers, dimethylamine epichlorohydrin polymers, epichlorohydrin-dimethylamine-ammonia polymers, quaternized polyethyleneimines, quaternized ethylene dichloride-ammonia polymers, and quaternized diallylamine polymers, said cooking being done in the presence of from 0.04–1.0% by weight based on the weight of the dry starch present in the slurry of a water soluble oxidizing agent from the group consisting of ammonium persulfate, potassium persulfate, hydrogen peroxide, sodium hypochlorite, ozone, and t-butyl hydroperoxide.

7. The method of claim 6 where the water-soluble metal-free inorganic oxidizing agent is ammonium persulfate and the water-soluble cationic quaternary ammonium polymer is an epichlorohydrin dimethylamine ammonia polymer.

8. The method of claim 7 where the water soluble quaternary ammonium polymer is a quaternized polydiallylamine.

* * * * *